United States Patent

Horbez et al.

[11] Patent Number: 5,876,587
[45] Date of Patent: Mar. 2, 1999

[54] ELECTROCHEMICAL SYNTHESIS OF TRANSITION METAL/PHOSPHINE CATALYSTS

[75] Inventors: Dominique Horbez, Franconville; Marc Huser, Villeurbanne; Robert Perron, Charly, all of France

[73] Assignee: Rhone-Poulenc Chimie, Courbevoie Cedex, France

[21] Appl. No.: 777,392

[22] Filed: Dec. 27, 1996

[30] Foreign Application Priority Data

Dec. 29, 1995 [FR] France .................. 95-15880

[51] Int. Cl.$^6$ .................. C25B 3/12
[52] U.S. Cl. .................. 205/457
[58] Field of Search .................. 205/457

[56] References Cited

U.S. PATENT DOCUMENTS

| | | | |
|---|---|---|---|
| 3,668,086 | 6/1972 | Hughes | 204/59 R |
| 3,674,661 | 7/1972 | Hughes | 204/73 R |
| 3,773,632 | 11/1973 | Lehmkuhl | 204/59 QM |
| 4,087,452 | 5/1978 | Kuntz | 260/465 |
| 4,557,809 | 12/1985 | Albertson | 204/59 QM |
| 5,118,824 | 6/1992 | Paumard et al. | 556/14 |
| 5,442,095 | 8/1995 | Auvray | 560/170 |
| 5,679,237 | 10/1997 | Chamard et al. | 205/420 |

FOREIGN PATENT DOCUMENTS

| | | |
|---|---|---|
| 2164470 | 6/1996 | Canada . |
| 0 354 845 A1 | 2/1990 | European Pat. Off. . |
| 0 475 820 A1 | 3/1992 | European Pat. Off. . |
| 0 715 890 A1 | 6/1996 | European Pat. Off. . |
| 2.080.556 | 11/1971 | France . |
| 2 338 253 | 8/1977 | France . |

*Primary Examiner*—Kathryn Gorgos
*Assistant Examiner*—Edna Wong
*Attorney, Agent, or Firm*—Burns, Doane, Swecker & Mathis, L.L.P.

[57] ABSTRACT

Catalyst compounds comprising at least one transition metal in an oxidation state of 0 to 1, and at least one monodentate or bidentate water-soluble phosphine, well suited for the hydrocyanation of ethylenically unsaturated compounds, are electrochemically synthesized, by electrolyzing an aqueous solution catholyte (contained in the cathode compartment of any suitable electrolytic cell) comprising at least one transition metal compound and at least one monodentate or bidentate water-soluble phosphine, advantageously at least one phosphine having the following formulae (I) and/or (II):

$$P(Ar1)_a(Ar2)_b(Ar3)_c(D1)_d(D2)_e(D3)_f \quad (I)$$

$$(Ar1)_a(Ar2)_b(D1)_d(D2)_eP\text{-}L\text{-}P(Ar1)_g(Ar2)_h(D1)_i(D2)_j \quad (II).$$

25 Claims, No Drawings

ELECTROCHEMICAL SYNTHESIS OF TRANSITION METAL/PHOSPHINE CATALYSTS

CROSS-REFERENCE TO COMPANION APPLICATIONS

Provisional Application No. 60/015,187, filed Apr. 12, 1996, the priority of which is hereby claimed, and applications Ser. No. 08/568,295, filed Dec. 6, 1995, now U.S. Pat. No. 5,679,237, and Ser. No. 08/774,910 [Attorney Docket No. 022701-707]pending, filed concurrently herewith; each is assigned to the assignee hereof.

BACKGROUND OF THE INVENTION

1. Technical Field of the Invention

The present invention relates to the electrochemical preparation of catalyst compounds, and more especially, to the electrochemical synthesis of catalyst compounds comprising at least one transition metal in an oxidation state of 0 to 1, and at least one monodentate or bidentate water-soluble phosphine.

Such final product compounds can be used, for example, as catalysts in lieu of the catalysts used for the hydrocyanation of ethylenically unsaturated compounds, as described in FR-A-2,338,253. Herein, these will be referred to as "catalysts," without this limiting their field of use.

SUMMARY OF THE INVENTION

Briefly, the present invention features a process for the electrochemical synthesis of catalysts comprising at least one transition metal in an oxidation state of 0 or 1, combined with at least one monodentate or bidentate water-soluble phosphine, which comprises electrolytically treating an aqueous solution containing at least one compound of a transition metal and at least one monodentate or bidentate water-soluble phosphine, placed in the cathode compartment of an electrolysis cell of an electrolyzer.

The at least one water-soluble phosphine starting compound is advantageously a monodentate phosphine having the general formula (I):

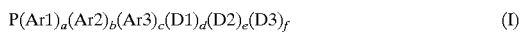

$$P(Ar1)_a(Ar2)_b(Ar3)_c(D1)_d(D2)_e(D3)_f \qquad (I)$$

in which Ar1 and Ar2, which may be identical or different, are each an aryl radical or aryl radical substituted by one or more substituents, such as alkyl or alkoxy radicals having from 1 to 4 carbon atoms, halogen atoms, nitrile groups, nitro groups, hydrophilic groups such as —COOM, —SO$_3$M or —PO$_3$M, wherein M is an inorganic or organic cationic residue selected from among a proton, cations derived from alkali metals or alkaline earth metals, ammonium cations —N(R)$_4$ in which the symbols R, which may be identical or different, are each a hydrogen atom or an alkyl radical having from 1 to 4 carbon atoms, the other cations derived from metals whose arylcarboxylic acid, arylsulfonic acid or arylphosphonic acid salts are water-soluble, —N(R)$_3$ in which the symbols R, which may be identical or different, are each a hydrogen atom or an alkyl radical having from 1 to 4 carbon atoms, and/or —OH groups; Ar3 is an aryl radical substituted by one or more substituents, such as alkyl or alkoxy radicals having from 1 to 4 carbon atoms, halogen atoms, nitrile groups, nitro groups, hydrophilic groups such as —COOM, —SO$_3$M or —PO$_3$M, wherein M is an inorganic or organic cationic residue selected from among a proton, cations derived from alkali metals or alkaline earth metals, ammonium cations —N(R)$_4$ in which the symbols R, which may be identical or different, are each a hydrogen atom or an alkyl radical having from 1 to 4 carbon atoms, the other cations derived from metals whose arylcarboxylic acid, arylsulfonic acid or arylphosphonic acid salts are water-soluble, —N(R)$_3$ in which the symbols R, which may be identical or different, are each a hydrogen atom or an alkyl radical having from 1 to 4 carbon atoms, and/or —OH groups, with the proviso that at least one of said substituents is a hydrophilic group; a, b and c, independently, are each 0 or 1; D1, D2 and D3, which may be identical or different, are each an alkyl radical, a cycloalkyl radical, or an alkyl or cycloalkyl radical substituted by one or more substituents, such as alkoxy radicals having 1 to 4 carbon atoms, halogen atoms, nitrile groups, nitro groups, hydrophilic groups such as —COOM, —SO$_3$M or —PO$_3$M, wherein M is an inorganic or organic cationic residue selected from among a proton, cations derived from alkali metals or alkaline earth metals, ammonium cations —N(R)$_4$ in which the symbols R, which may be identical or different, are each a hydrogen atom or an alkyl radical having from 1 to 4 carbon atoms, the other cations derived from metals whose arylcarboxylic acid, arylsulfonic acid or arylphosphonic acid salts are water-soluble, —N(R)$_3$ in which the symbols R, which may be identical or different, are each a hydrogen atom or an alkyl radical having from 1 to 4 carbon atoms, and/or —OH groups; d, e and f, independently, are each 0 or 1, with the proviso that the sum (a+b+c+d+e+f) is equal to 3.

The at least one phosphine starting compound can also be a bidentate phosphine having the general formula (II):

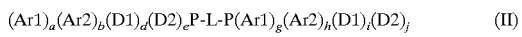

$$(Ar1)_a(Ar2)_b(D1)_d(D2)_e P-L-P(Ar1)_g(Ar2)_h(D1)_i(D2)_j \qquad (II)$$

in which Ar1, Ar2, D1 and D2 have the formula (I) definitions indicated above;

a, b, d, e, g, h, i and i are each 0 or 1;
the sum (a+b+d+e) is equal to 2;
the sum (g+h+i+j) is equal to 2; and
L is a single valence bond or a divalent hydrocarbon radical, such as an alkylene radical, a cycloalkylene radical, an arylene radical, a radical derived from a heterocycle containing one or two oxygen, nitrogen or sulfur heteroatoms in the ring, these various cyclic radicals being bonded directly to one of the phosphorus atoms, or to the two phosphorus atoms, or being bonded to one of the phosphorus atoms or to the two via a linear or branched alkylene radical having from 1 to 4 carbon atoms, with the proviso that the ring or rings comprising the divalent radical L can be substituted by one or more substituents such as those indicated for Ar1, Ar2, Ar3, D1, D2 and D3.

DETAILED DESCRIPTION OF BEST MODE AND SPECIFIC/PREFERRED EMBODIMENTS OF THE INVENTION

More particularly according to the present invention, exemplary metals whose carboxylic acid, sulfonic acid or phosphonic acid salts are water-soluble include lead, zinc and tin.

Herein, by the expression "water-soluble" is intended a compound which is soluble to an extent of at least 0.01 g per liter of water.

The preferred water-soluble phosphines are the phosphines of formula (I) or of formula (II) in which Ar1 and Ar2 are phenyl groups or phenyl groups substituted by one or two substituents as described above; Ar3 is a phenyl group substituted by one or two substituents as described above; D1, D2 and D3, which may be identical or different, are alkyl radicals having from 1 to 6 carbon atoms, cycloalkyl radicals having from 5 to 8 carbon atoms, alkyl radicals having from 1 to 6 carbon atoms or cycloalkyl radicals having from 5 to 8 carbon atoms substituted by one or more substituents as defined above; and L is a single valence bond, an alkylene radical having from 1 to 6 carbon atoms, a monocyclic or bicyclic cycloalkylene radical having from 4 to 12 carbon atoms, a phenylene radical, a diphenylene radical, a naphthylene radical, a dinaphthylene radical, a radical derived from a heterocycle containing one or two oxygen, nitrogen or sulfur heteroatoms in the ring, these various cyclic radicals being bonded directly to one of the phosphorus atoms, or to the two phosphorus atoms, or being bonded to one of the phosphorus atoms or to the two via a linear or branched alkylene radical having from 1 to 4 carbon atoms, with the proviso that the ring or rings comprising the divalent radical L can be substituted by one or more substituents such as an alkyl radical having from 1 to 4 carbon atoms.

Particularly preferred water-soluble phosphines are the phosphines of formula (I) or of formula (II) in which the substituent or substituents of Ar1 and Ar2, which may be identical or different, are each alkyl or alkoxy radicals having from 1 to 2 carbon atoms, chlorine atoms, hydrophilic groups such as —COOM, —SO$_3$M or —PO$_3$M, wherein M is an inorganic or organic cationic residue selected from among a proton, cations derived from sodium, from potassium, from calcium or from barium, ammonium, tetramethylammonium, tetraethylammonium, tetrapropylammonium and tetrabutylammonium cations, cations derived from zinc, from lead or from tin, —N(R)$_3$ in which the symbols R, which may be identical or different, are each a hydrogen atom or an alkyl radical having from 1 to 4 carbon atoms, and/or —OH groups, and the substituent or substituents of Ar3, which may be identical or different, are each alkyl or alkoxy radicals having from 1 to 2 carbon atoms, chlorine atoms, hydrophilic groups such as —COOM or —PO$_3$M, wherein M is an inorganic or organic cationic residue selected from among a proton, cations derived from sodium, from potassium, from calcium or from barium, ammonium, tetramethylammonium, tetraethylammonium, tetrapropylammonium and tetrabutylammonium cations, cations derived from zinc, from lead or from tin, —N(R)$_3$ in which the symbols R, which may be identical or different, are each a hydrogen atom or an alkyl radical having from 1 to 4 carbon atoms, and/or —OH groups, with the proviso that at least two of said substituents of Ar1, Ar2, Ar3, D1, D2 and D3 for the phosphines of formula (I) and of Ar1, Ar2, D1 and D2 for the phosphines of formula (II) are hydrophilic groups as defined above.

Particularly exemplary phosphines of general formula (I) include tris(hydroxymethyl)phosphine, tris(2-hydroxyethyl) phosphine, tris(3-hydroxypropyl)phosphine, tris(2-carboxymethyl)phosphine, the sodium salt of tris(3-carboxyphenyl)phosphine, tris(3-carboxyethyl)phosphine, the iodide of tris(4-trimethylammoniumphenyl)phosphine, the sodium salt of tris(2-phosphoethyl)phosphine, bis(2-carboxyethyl)phenyl phosphine, hydroxymethyl bis(2-hydroxyethyl)phosphine, the sodium salt of tris(para-phosphophenyl)phosphine, the sodium salt of bis(meta-sulfophenyl) paracarboxyphenyl phosphine, and the sodium salt of bis(meta-sulfophenyl)sulfo-2-ethyl phosphine.

Particularly exemplary phosphines of general formula (II) include the sodium salt of 2,2'-bis[di(sulfonatophenyl) phosphino]-1,1'-dinaphthyl, the sodium salt of 1,2-bis[di(sulfonatophenyl)phosphinomethyl]cyclobutane (CBDTS), 1,1-bis(dihydroxymethylphosphino)ethane, 1,3-bis(dihydroxymethylphosphino)propane and the sodium salt of 2,2'-bis[di(sulfonatophenyl)phosphinomethyl]-1,1'-dinaphthyl.

Of course, a mixture of a plurality of these phosphines can also be used.

Certain of these water-soluble phosphines of formula (I) or (II) are commercially available.

The others can be prepared via the general or specific phosphine syntheses described in general texts such as Houben-Weyl, *Method der Organischen Chemie*, "Organische Phosphor Verbindungen," Volume 1 (1963).

Lastly, for the preparation of the water-soluble derivatives not described, it is possible, starting with phosphines containing no water-soluble substituents as defined above, to easily introduce one or more of these hydrophilic substituents. Thus, the sulfonate groups, for example, may be introduced via reaction with SO$_3$ in sulfuric acid. The carboxylate, phosphonate and quaternary ammonium groups may likewise be introduced via conventional techniques for this type of synthesis.

The preferred transition metal compounds include nickel, cobalt, iron, palladium, platinum, rhodium and iridium compounds. Water-soluble compounds or compounds that dissolve under the reaction conditions are used. The residue bonded to the metal is not essential, provided that it satisfies these conditions.

Among these compounds, the most preferred are compounds of nickel. Exemplary thereof are compounds such as nickel carboxylates (in particular acetate, formate and citrate), nickel carbonate, nickel bicarbonate, nickel borate, nickel bromide, nickel chloride, nickel iodide, nickel thiocyanate, nickel cyanide, nickel hydroxide, nickel hydrophosphite, nickel phosphite, nickel phosphate and derivatives thereof, nickel nitrate, nickel sulfate, nickel sulfite and nickel aryl and alkyl sulfonates.

It is not essential that the nickel compound itself be water-soluble. For example, nickel cyanite, which is sparingly soluble in water, dissolves well in an aqueous solution of water-soluble phosphine.

The electrolysis or electrolytic cell of the electrolyzer employed in the present process of the invention comprises a cathode compartment and an anode compartment which are separated by appropriate separator element.

The cathode in the electrolysis cell may be made of a material such as platinum, gold, iridium, ruthenium, palladium, nickel, graphite, vitreous carbon, iron, stainless steel, a special steel, lead, zinc, cadmium, mercury, or an amalgam. It may also be made of titanium, of tantalum, of nickel or of a stainless steel, coated with a layer of platinum, of gold, of iridium, of ruthenium, of a mixture of a plurality of these metals, of platinum, palladium, iridium, rhodium, ruthenium, osmium, or tantalum oxides, or of a mixture of more than one of these oxides.

The cathode may have a planar structure, such as a plate or grid, or a voluminal structure; it can in particular be perforated or comprise a variety of openings. As types of voluminal structures, granular stacks of the previously mentioned materials, or felts or foams thereof may be used.

The anode may be made of a material such as platinum, gold, iridium, ruthenium, palladium, nickel, graphite, vitreous carbon, a stainless steel, a special steel or lead. It may also be made of titanium or tantalum coated with a layer of platinum, gold, of iridium, of ruthenium, of a mixture of more than one of these metals, of platinum, palladium, iridium, rhodium, ruthenium, osmium or tantalum oxides, or of a mixture of more than one of these oxides.

The structure of the anode may be of different types from that defining the cathode.

The separator element of the electrolysis cell advantageously comprises an ion-exchange membrane or a porous diaphragm.

The membranes may be of the cationic type, especially those prepared from cation-exchange resins comprising acid groups such as sulfonic groups or carboxylic groups. Preferably, membranes prepared from sulfonic resins will be used. Exemplary such membranes include, for example, those marketed under the NAFION® (perfluorinated sulfonic membranes) or SELEMION® trademarks.

The membranes may also be of the anionic type, but cationic membranes are generally preferred since they present a certain number of advantages. In particular, they are stronger than anionic membranes and they also permit stronger currents to be utilized.

The porous diaphragms are especially diaphragms made of porous ceramic, diaphragms made of woven or non-woven synthetic fibers, or deposited diaphragms based on asbestos fibers or on synthetic fibers.

The separator element may be arranged such as to bear on the anode or on the cathode.

As indicated above, the aqueous solution containing the monodentate or bidentate water-soluble phosphine and the transition metal compound is introduced into the cathode compartment. The initial concentration of monodentate or bidentate water-soluble phosphine generally ranges from $10^{-3}$ mol/liter to 1 mol/liter. The initial concentration of transition metal compound, especially of nickel compound, generally ranges from $10^{-5}$ mol/liter to 1 mol/liter.

Other compounds that increase the conductivity of the electrolyte, such as soluble salts for example, may be added to the cathode compartment.

Complexing agents that modify the potential at which the reduction of the transition metal takes place may also be added. Exemplary such complexing agents are the cyanides and chlorides.

The solution in the cathode compartment may furthermore include compounds that complement the catalyst prepared by the process of the invention. These compounds are, in particular, Lewis acids.

Herein, by the term "Lewis acid" is intended the usual definition thereof, i.e., electron-pair-acceptor compound.

The Lewis acids described in the text edited by G. A. Olah, *Friedel-Crafts and Related Reactions*, Volume 1, pages 191 to 197 (1963) are particularly suitable.

The Lewis acids which are useful in the cathode compartment are selected from among compounds of the elements of Groups Ib, IIb, IIIa, IIIb, IVa, IVb, Va, Vb, VIb, VIIb and VIII of the Periodic Table, as published in the *Handbook of Chemistry and Physics*, 51st Edition (1970–1971) of The Chemical Rubber Co., insofar as said compounds are at least partially soluble and stable in water or, more generally, in the aqueous solution to be subjected to electrolysis. These compounds are typically, but without any limitation being implied, salts, in particular halides, preferably chlorides and bromides, sulfates, nitrates, sulfonates, especially trifluoromethanesulfonates, carboxylates, acetylacetonates, tetrafluoroborates and phosphates.

Exemplary such Lewis acids include zinc chloride, zinc bromide, zinc iodide, zinc trifluoromethanesulfonate, zinc acetate, zinc nitrate, zinc tetrafluoroborate, manganese chloride, manganese bromide, nickel chloride, nickel bromide, nickel cyanide, nickel acetylacetonate, cadmium chloride, cadmium bromide, stannous chloride, stannous bromide, stannous sulfate, stannous tartrate, the chlorides, bromides, sulfates, nitrates, carboxylates or trifluoromethanesulfonates of rare earth elements such as lanthanum, cerium, praseodymium, neodymium, samarium, europium, gadolinium, terbium, dysprosium, holmium, erbium, thulium, ytterbium and lutetium, cobalt chloride, ferrous chloride and yttrium chloride.

Mixtures of several of these Lewis acids can, of course, also be used.

Among the Lewis acids which are suitable, preferred are zinc chloride, zinc bromide, zinc sulfate, zinc tetrafluoroborate, stannous chloride, stannous bromide, zinc chloride/stannous chloride mixtures, nickel chloride, nickel bromide and nickel acetylacetonate.

The Lewis acid advantageously constitutes from 0 to 50 mol per mole of transition metal compound, more particularly of nickel compound, and preferably from 0 to 10 mol per mole.

The anode compartment contains an aqueous solution of an anolyte, which may comprise an acid such as, especially, sulfuric acid, nitric acid, water-soluble carboxylic acids such as acetic acid, of their salts, especially sodium, potassium, ammonium or quaternary ammonium salts, or a base such as, especially, sodium hydroxide or potassium hydroxide. Preferably, the anolyte will be selected from among sulfuric acid and salts thereof, especially dipotassium sulfate, potassium hydrogen sulfate, disodium sulfate and sodium hydrogen sulfate.

The anolyte may also comprise one or more of the monodentate or bidentate water-soluble phosphines as described above.

The initial concentration of the anolyte in the solution in the anode compartment generally ranges from $10^{-3}$ mol/liter to 3 mol/liter.

The electric current employed in the process of the invention is defined by its intensity (strength) and the cathode potential (voltage). The potential may be maintained constant throughout the electrolysis (potentiostatic process). Another option is to maintain the intensity constant (galvanostatic process). In continuous operation of the process of the invention, these two embodiments are equivalent.

When the process is carried out at constant potential, the value thereof may readily be determined by one skilled in this art from the plot of current/potential curves.

The current density may attain a value of 30 $A/dm^2$. It is adjusted depending on the amount of transition metal to be reduced.

The temperature at which the process is carried out generally ranges from 0° C. to 95° C.

A preferred embodiment of the process of the invention comprises regenerating spent catalyst, namely, a catalyst which had been used and has become at least partially inactive. Thus, a catalyst based on monodentate or bidentate water-soluble phosphine and on a transition metal in oxidation state 0 or 1, optionally also containing one or more Lewis acids, used for the hydrocyanation of butadiene and/or of pentenenitriles becomes gradually deactivated, in particular by oxidation of the transition metal. This latter, and more particularly nickel, is at least partially converted into cyanide. At the end of the hydrocyanation reaction, the aqueous phase containing, in particular, the monodentate or bidentate water-soluble phosphine and the compound of the transition metal may readily be separated from the organic phase. This aqueous phase may contain variable amounts of compounds initially introduced, such as butadiene and/or pentenenitriles, or formed during the reaction, such as adiponitrile, methylglutaronitrile, ethylsuccinonitrile, pentenenitriles and methylbutenenitriles. The aqueous phase is treated electrochemically as described above in order to regenerate the catalyst.

In order to further illustrate the present invention and the advantages thereof, the following specific examples are given, it being understood that same are intended only as illustrative and in nowise limitative.

EXAMPLES

Apparatus Used:

The electrolytic cell comprised a cylindrical glass container having a working volume of about 100 ml, which contained a grid-shaped platinum cathode and a cylindrical anode well placed inside the cathodic grid and which included, at its base, a NAFION 417® resin membrane, and in which the plate-shaped platinum anode was immersed.

The electrolyzer was connected to a potentiostat which enabled the cathode voltage to be maintained at a value of −1.2 volt relative to a reference Ag/AgCl electrode.

Abbreviations employed:
3PN=3-pentenenitrile
ADN=adiponitrile
RT=selectivity for a compound obtained in relation to the converted initial compound
t.o.=turnover=number of mmoles of dinitriles formed per mmole of Ni(O) introduced
COD=cyclooctadiene.

Example 1

Synthesis of an Ni(O)/CBDTS Catalyst by Electrochemical Reduction of Ni(CN)$_2$ in an Aqueous Solution of CBDTS 50 ml of an aqueous solution containing 7.5 moles nickel cyanide Ni(CN)$_2$ and 15 mmoles of the sodium salt of 1,1-bis[di(sulfonatophenyl)phosphinomethyl]cyclobutane (CBDTS) were introduced into the cathode compartment of the electrolyzer.

50 ml of an aqueous solution of sulfuric acid (0.02N) were introduced into the anode compartment.

Electrolysis was carried out at 25° C. at a controlled voltage of −1.2 V. Samples were periodically removed to determine the amount of the remaining Ni(II) by polarographic analysis.

After electrolysis for 15 hours, 80% of the Ni(II) was converted into Ni(O).

Example 2

Hydrocyanation of 3-Pentenenitrile Using the Electrochemically-Produced Solution of Example 1

The results obtained are reported in the following Table:

TABLE

| Tests | Catalyst | Ni (O) (mmole) | HCN (mmole/h) | RT of ADN (%) | t.o. |
|---|---|---|---|---|---|
| CE1* | Ni (COD)$_2$/CBDTS | 4.5 | 44 | 81 | 4 |
| CE2** | Ni (CN)$_2$(CBDTS) | 0 | 44 | 0 | 0 |
| Example 2 | Solution 1 | 3.6 | 35 | 80 | 5 |

The operating conditions for the hydrocyanation tests were:
3PN: 204 mmoles; ZnCl$_2$:20 mmoles; 65° C.; 0.5 hour.

CE1*=comparative test using a catalyst prepared by exchange of the COD ligands of Ni(COD)$_2$ by CBDTS.

CE2**=comparative test using a solution of Ni(CN)$_2$ (CBDTS) which was not electrochemically treated.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the electrochemical synthesis of a compound comprising at least one transition metal in an oxidation state of 0 or 1 and at least one monodentate or bidentate water-soluble phosphine, which comprises electrolyzing an aqueous solution catholyte containing at least one transition metal compound and said at least one monodentate or bidentate water-soluble phosphine.

2. The process as defined by claim 1, wherein said at least one monodentate or bidentate water-soluble phosphine has the Formula (I):

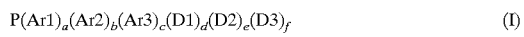

$$P(Ar1)_a(Ar2)_b(Ar3)_c(D1)_d(D2)_e(D3)_f \qquad (I)$$

in which Ar1 and Ar2, which are identical or different, are each an aryl radical or aryl radical substituted by one or more substituents selected from the group consisting of alkyl and alkoxy radicals having from 1 to 4 carbon atoms, halogen atoms, nitrile groups, nitro groups, hydrophilic groups selected from the group consisting of —COOM, —SO$_3$M and —PO$_3$M, wherein M is an inorganic or organic cationic residue selected from the group consisting of per amendment a proton, cations derived from alkali metals or alkaline earth metals, ammonium cations —N(R)$_4$ in which the symbols R, which are identical or different, are each a hydrogen atom or an alkyl radical having from 1 to 4 carbon atoms, other cations derived from metals whose arylcarboxylic acid, arylsulfonic acid or arylphosphonic acid salts are water-soluble, —N(R)$_3$ in which the symbols R, which are identical or different, are each a hydrogen atom or an alkyl radical having from 1 to 4 carbon atoms, and —OH groups; Ar3 is an aryl radical substituted by one or more substituents selected from the group consisting of alkyl or alkoxy radicals having from 1 to 4 carbon atoms, halogen atoms, nitrile groups, nitro groups, the hydrophilic groups —COOM or —PO$_3$M, wherein M is an inorganic or organic cationic residue selected from the group consisting of a proton, cations derived from alkali metals or alkaline earth metals, ammonium cations —N(R)$_4$ in which the symbols R, which are identical or different, are each a hydrogen atom or an alkyl radical having from 1 to 4 carbon atoms, other cations derived from metals whose arylcarboxylic acid, arylsulfonic acid or arylphosphonic acid salts are water-soluble, —N(R)$_3$ in which the symbols R, which are identical or different, are each a hydrogen atom or an alkyl radical having from 1 to 4 carbon atoms, and —OH groups, with the proviso that at least one of said substituents is a hydrophilic group; a, b and c, independently, are each 0 or 1; D1, D2 and D3, which are identical or different, are each an alkyl radical, a cycloalkyl radical, or an alkyl or cycloalkyl radical substituted by one or more substituents selected from the group consisting of alkoxy radicals having 1 to 4 carbon atoms, halogen atoms, nitrile groups, nitro groups, the hydrophilic groups —COOM, —SO$_3$M or —PO$_3$M, wherein M is an inorganic or organic cationic residue selected from the group consisting of a proton, cations derived from alkali metals or alkaline earth metals, ammonium cations —N(R)$_4$ in which the symbols R, which are identical or different, are each a hydrogen atom or an alkyl radical having from 1 to 4 carbon atoms, other cations derived from metals whose arylcarboxylic acid, arylsulfonic acid or arylphosphonic acid salts are water-soluble, —N(R)$_3$ in which the symbols R, which are identical or different, are each a hydrogen atom or an alkyl radical having from 1 to 4 carbon atoms, and —OH groups; d, e and f, independently, are each 0 or 1, with the proviso that the sum of a, b, c, d, e, and f, in Formula I, is equal to 3.

3. The process as defined by claim 2, wherein Ar1 and Ar2 are phenyl groups or phenyl groups bearing one or two of said substituents; Ar3 is a phenyl group bearing one or two of said substituents; and D1, D2 and D3 are each an alkyl radical having 1 to 6 carbon atoms, a cycloalkyl radical having 5 to 8 carbon atoms, or a cycloalkyl radical having 5 to 8 carbon atoms bearing one or more of said substituents.

4. The process as defined by claim 1, wherein said at least one monodentate or bidentate water-soluble phosphine has the formula (II):

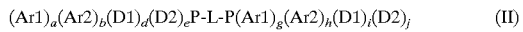 (II)

in which Ar1 and Ar2, which are identical or different, are each an aryl radical or aryl radical substituted by one or more substituents selected from the group consisting of alkyl and alkoxy radicals having from 1 to 4 carbon atoms, halogen atoms, nitrile groups, nitro groups, the hydrophilic groups —COOM, —SO$_3$M or —PO$_3$M, wherein M is an inorganic or organic cationic residue selected from the group consisting of a proton, cations derived from alkali metals or alkaline earth metals, ammonium cations —N(R)$_4$ in which the symbols R, which are identical or different, are each a hydrogen atom or an alkyl radical having from 1 to 4 carbon atoms, other cations derived from metals whose arylcarboxylic acid, arylsulfonic acid or arylphosphonic acid salts are water-soluble, —N(R)$_3$ in which the symbols R, which are identical or different, are each a hydrogen atom or an alkyl radical having from 1 to 4 carbon atoms, and —OH groups; D1 and D2, which are identical or different, are each an alkyl radical, a cycloalkyl radical, or an alkyl or cycloalkyl radical substituted by one or more substituents selected from the group consisting of alkoxy radicals having from 1 to 4 carbon atoms, halogen atoms, nitrile groups, nitro groups, the hydrophilic groups —COOM, —SO$_3$M or —PO$_3$M, wherein M is an inorganic or organic cationic residue selected from the group consisting of a proton, cations derived from alkali metals or alkaline earth metals, ammonium cations —N(R)$_4$ in which the symbols R, which are identical or different, are each a hydrogen atom or an alkyl radical having from 1 to 4 carbon atoms, other cations derived from metals whose carboxylic acid, sulfonic acid or phosphoric acid salts are water-soluble, —N(R)$_3$ in which the symbols R, which are identical or different, are each a hydrogen atom or an alkyl radical having from 1 to 4 carbon atoms, and —OH groups; a, b, d, e, g, h, i and j, independently, are each 0 or 1; the sum of a, b, d, and e is equal to 2; the sum of g, h, i, j is equal to 2; and L is a single valence bond or a divalent hydrocarbon radical selected from the group consisting of an alkylene radical, a cycloalkylene radical, an arylene radical, a radical derived from a heterocycle containing one or two oxygen, nitrogen or sulfur heteroatoms in the ring, the cyclic radicals being bonded directly to one of the phosphorus atoms, or to the two phosphorus atoms, or being bonded to one of the phosphorus atoms or to the two via a linear or branched alkylene radical having from 1 to 4 carbon atoms, with the proviso that the ring or rings comprising the divalent radical L is optionally substituted by one or more substituents indicated for Ar1, Ar2, D1 and D2.

5. The process as defined by claim 4, wherein said separator element comprises a porous ceramic diaphragm, a woven or non-woven synthetic fiber diaphragm, or a deposited diaphragm based on asbestos fibers or on synthetic fibers.

6. The process as defined by claim 4, wherein said anode compartment contains an aqueous solution of an anolyte which comprises an acid or salt thereof, or a base.

7. The process as defined by claim 6, wherein the anolyte in the solution in the anode compartment has an initial concentration ranging from 10$^{-3}$ mol/liter to 3 mol/liter.

8. The process as defined by claim 4, wherein formula (II) Ar1 and Ar2 are phenyl groups or phenyl groups bearing one or two of said substituents; D1 and D2 are each an alkyl radical having from 1 to 6 carbon atoms, a cycloalkyl radical having from 5 to 8 carbon atoms, or a cycloalkyl radical having 5 to 8 carbon atoms bearing one or more of the said substituents; and L is a single valence bond, an alkylene radical having from 1 to 6 carbon atoms, a monocyclic or bicyclic cycloalkylene radical having from 4 to 12 carbon atoms, a phenylene radical, a diphenylene radical, a naphthylene radical, a dinaphthylene radical, a radical derived from a heterocycle containing one or two oxygen, nitrogen or sulfur heteroatoms in the ring, these various cyclic radicals being bonded directly to one of the phosphorus atoms, or to the two phosphorus atoms, or being bonded to one of the phosphorus atoms or to the two via a linear or branched alkylene radical having from 1 to 4 carbon atoms, with the proviso that the ring or rings comprising the divalent radical L is optionally be substituted by one or more of said substituents.

9. The process as defined by claim 1, carried out in an electrolytic cell comprising a cathode, an anode, a cathode compartment and an anode compartment, said compartments are separated by a separator element which comprises an ion-exchange membrane or a porous diaphragm.

10. The process as defined by claim 9, wherein said anode compartment contains an aqueous solution of an anolyte which comprises the monodentate or bidentate water-soluble phosphine.

11. The process as defined by claim 9, wherein the cathode of said electrolytic cell comprises platinum, gold, iridium, ruthenium, palladium nickel, graphite, vitreous carbon, iron, a stainless steel, lead, zinc, cadmium, mercury, an amalgam, titanium, tantalum, nickel, stainless steel, coated with a layer comprising platinum, gold, iridium, ruthenium, or a mixture thereof, or oxides of platinum, palladium, iridium, rhodium, ruthenium, osmium, tantalum, or a mixture thereof.

12. The process as defined by claim 9, wherein the cathode and the anode of said electrolytic cell has a planar or a voluminal structure comprising perforations or openings.

13. The process as defined by claim 9, wherein the cathode or the anode of said electrolytic cell has a voluminal structure comprising a granular stack of material, or felt or foam thereof.

14. The process as defined by claim 9, wherein the anode of said electrolytic cell comprises platinum, gold, iridium, ruthenium, palladium, nickel, graphite, vitreous carbon, a stainless steel lead, or titanium or tantalum coated with a layer of platinum, gold, iridium, ruthenium, or a mixture thereof, or oxides of platinum, palladium, iridium, rhodium, ruthenium, osmium, tantalum, or a mixture thereof.

15. The process as defined by claim 9, wherein the separator element comprises a cationic membrane made of a cation-exchange resin containing acid functional groups.

16. The process as defined by claim 1, wherein said at least one transition metal compound comprises a compound of nickel, cobalt, iron, palladium, platinum, rhodium or iridium that is soluble in water or which dissolves therein during the electrolyzing of the aqueous solution.

17. The process as defined by claim 1, wherein said at least one transition metal compound comprises nickel carboxylate, nickel carbonate, nickel bicarbonate, nickel borate, nickel bromide, nickel chloride, nickel iodide, nickel thiocyanate, nickel cyanide, nickel hydroxide, nickel hydrophosphate, nickel phosphite, nickel phosphate or their derivatives, nickel nitrate, nickel sulfate, nickel sulfite, nickel arylsulfonate or nickel alkylsulfonate.

18. The process as defined by claim 1, wherein the monodentate or bidentate water-soluble phosphine in said catholyte has an initial concentration ranging from $10^{-3}$ mol/liter to 1 mol/liter and the transition metal compound therein has an initial concentration ranging from $10^{-5}$ mol/liter to 1 mol/liter.

19. The process as defined by claim 1, wherein said catholyte further comprises a compound that increases an electrolyte's or complexing agent's conductivity to modify the potential at which reduction of said transition metal occurs.

20. The process as defined by claim 19, wherein said catholyte further comprises a Lewis acid selected from the group consisting of compounds of the elements of Groups Ib, IIb, IIIa, IIIb, IVa, IVb, Va, Vb, VIb, VIIb and VIII of the Periodic Table.

21. The process as defined by claim 20, wherein said Lewis acid comprises zinc chloride, zinc bromide, zinc iodide, zinc trifluoromethanesulfonate, zinc acetate, zinc nitrate, zinc tetrafluoroborate, manganese chloride, manganese bromide, nickel chloride, nickel bromide, nickel cyanide, nickel acetylacetonate, cadmium chloride, cadmium bromide, stannous chloride, stannous bromide, stannous sulfate, stannous tartrate, a chlorobromide, sulfate, nitrate, carboxylate or trifluoromethanesulfonate of lanthanum, cerium, praseodymium, neodymium, samarium, europium, gadolinium, terbium, dysprosium, holmium, erbium, thulium, ytterbium or lutetium, cobalt chloride, ferrous chloride or yttrium chloride.

22. The process as defined by claim 20, wherein said Lewis acid comprises zinc chloride, zinc bromide, zinc sulfate, zinc tetrafluoroborate, stannous chloride, stannous bromide, a zinc chloride/stannous chloride mixture, nickel chloride, nickel bromide or nickel acetylacetonate.

23. The process as defined by claim 22, wherein the Lewis acid ranges from 0 to 50 mol per mole of transition metal compound.

24. The process as defined by claim 1, wherein said monodentate or bidentate water-soluble phosphine comprises tris(hydroxymethyl)phosphine, tris(2-hydroxyethyl)phosphine, tris(3-hydroxypropyl)phosphine, tris(2-carboxymethyl)phosphine, the sodium salt of tris(3-carboxyphenyl)phosphine, tris(3-carboxyethyl)phosphine, the iodide of tris(4-trimethylammoniumphenyl)phosphine, the sodium salt of tris(2-phosphoethyl)phosphine, bis(2-carboxyethyl)phenyl phosphine, hydroxymethyl bis(2-hydroxyethyl)phosphine, the sodium salt of tris(para-phosphophenyl)phosphine, the sodium salt of bis(meta-sulfophenyl) para-carboxyphenyl phosphine, or the sodium salt of bis(meta-sulfophenyl) sulfo-2-ethyl phosphine.

25. The process as defined by claim 1, wherein said monodentate or bidentate water-soluble phosphine comprises the sodium salt of 2,2'-bis[di(sulfonatophenyl)phosphino]-1,1'-dinaphthyl, the sodium salt of 1,2-bis cyclobutane (CBDTS); 1,2-bis(dihydroxymethylphosphino) ethane, 1,3-bis(dihydroxymethylphosphino)propane or the sodium salt of 2,2'-bis[di(sulfonatophenyl)phosphinomethyl]-1,1'-dinaphthyl.

* * * * *